(12) United States Patent
Zhang

(10) Patent No.: US 9,412,311 B2
(45) Date of Patent: Aug. 9, 2016

(54) BACKLIGHT MODULE WITH 2D/3D BACKLIGHT SWITCHING UNIT AND DISPLAY DEVICE COMPRISING THE BACKLIGHT MODULE

(71) Applicant: BOE TECHNOLOGY GROUP CO., LTD., Beijing (CN)

(72) Inventor: Kailiang Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 12 days.

(21) Appl. No.: 14/342,231

(22) PCT Filed: Apr. 18, 2013

(86) PCT No.: PCT/CN2013/074377
§ 371 (c)(1),
(2) Date: Feb. 28, 2014

(87) PCT Pub. No.: WO2014/127574
PCT Pub. Date: Aug. 28, 2014

(65) Prior Publication Data
US 2015/0170581 A1      Jun. 18, 2015

(30) Foreign Application Priority Data

Feb. 25, 2013  (CN) .......................... 2013 1 0059152

(51) Int. Cl.
*G09G 5/00* (2006.01)
*G09G 3/34* (2006.01)
(Continued)

(52) U.S. Cl.
CPC .............. *G09G 3/3406* (2013.01); *G02B 27/22* (2013.01); *H04N 13/0454* (2013.01);
(Continued)

(58) Field of Classification Search
CPC ..... G09G 3/342; G09G 3/3406; G02B 27/22; H04N 13/0454

USPC ....................................................... 345/6, 102
See application file for complete search history.

(56) References Cited

U.S. PATENT DOCUMENTS

2005/0141065 A1* 6/2005 Masamoto ...................... 359/15
2005/0276071 A1* 12/2005 Sasagawa et al. ............. 362/607
(Continued)

FOREIGN PATENT DOCUMENTS

CN         1645219 A      7/2005
CN       102345801 A      2/2012
(Continued)

OTHER PUBLICATIONS

International Search Report mailed Nov. 28, 2013; PCT/CN2013/074377.
(Continued)

*Primary Examiner* — Adam J Snyder
(74) *Attorney, Agent, or Firm* — Ladas & Parry LLP

(57) ABSTRACT

A backlight module and a display device comprising the backlight module, the backlight module, including: a backlight source, including a plurality of backlight lamps (5); and a backlight source control device, including: a backlight source driving device, configured to provide a driving signal to the backlight source; a 2D/3D backlight switching unit; and a first switch, connected with the 2D/3D backlight switching unit, wherein the 2D/3D backlight switching unit (4) is configured to control switching-on and switching-off of the first switch while a displaying mode is switched between a 2D displaying mode and a 3D displaying mode, and the backlight source driving device is directly connected with a part of the plurality of backlight lamps of the backlight source, and the remaining backlight lamps in the backlight source are connected with the backlight source driving device via the first switch. By flexibly controlling over the backlight source, the brightness of the backlight source can be flexibly controlled while a display device is switched between the 2D displaying mode and the 3D displaying mode.

20 Claims, 2 Drawing Sheets

(51) Int. Cl.
*G02B 27/22* (2006.01)
*H04N 13/04* (2006.01)
*H05B 33/08* (2006.01)
*H05B 41/392* (2006.01)
*G02F 1/1335* (2006.01)

(52) U.S. Cl.
CPC ......... *H05B 33/0845* (2013.01); *H05B 41/392* (2013.01); *G02F 2001/133626* (2013.01); *G09G 3/342* (2013.01); *G09G 2320/0209* (2013.01)

(56) References Cited

U.S. PATENT DOCUMENTS

| | | | |
|---|---|---|---|
| 2006/0181895 A1* | 8/2006 | Hu et al. | 362/551 |
| 2007/0008456 A1* | 1/2007 | Lesage et al. | 349/62 |
| 2007/0047058 A1* | 3/2007 | Lim | 359/267 |
| 2007/0242068 A1* | 10/2007 | Han et al. | 345/427 |
| 2008/0013001 A1* | 1/2008 | Jang et al. | 349/15 |
| 2008/0122815 A1* | 5/2008 | Son | H04N 13/0456 345/204 |
| 2009/0067156 A1* | 3/2009 | Bonnett et al. | 362/97.2 |
| 2010/0072898 A1* | 3/2010 | Ohashi et al. | 315/127 |
| 2011/0089860 A1 | 4/2011 | Kuo et al. | |
| 2011/0115889 A1* | 5/2011 | Kim et al. | 345/690 |
| 2012/0306859 A1* | 12/2012 | Eom et al. | 345/690 |
| 2013/0050280 A1* | 2/2013 | Huang | 345/690 |
| 2013/0235287 A1* | 9/2013 | Im et al. | 349/15 |
| 2013/0257827 A1* | 10/2013 | Hsieh | G09G 3/342 345/204 |

FOREIGN PATENT DOCUMENTS

CN  203131599 U  8/2013
JP  2009-093989 A  4/2009

OTHER PUBLICATIONS

International Preliminary Report on Patentability issued Aug. 25, 2015; PCT/CN2013/074377.
First Chinese Office Action Appln. No. 201310059152.4; Dated Oct. 26, 2015.
Second Chinese Office Action dated Jun. 6, 2016; Appln. No. 201310059152.4.

\* cited by examiner ing mode, and the backlight source driving device is directly connected with a part of the plurality of backlight lamps of the backlight source, and the remaining backlight lamps in the backlight source are connected with the backlight source driving device via the first switch.

BACKLIGHT MODULE WITH 2D/3D BACKLIGHT SWITCHING UNIT AND DISPLAY DEVICE COMPRISING THE BACKLIGHT MODULE

TECHNICAL FIELD

Embodiments of the present invention relate to a backlight module and a display device comprising the backlight module.

BACKGROUND

At present, a pair of "stereoscopic images" having "binocular parallax" can be controlled to enter a left eye and a right eye of a viewer by controlling a signal or by using an auxiliary device, and based on a principle of binocular parallax, the viewer can view a 3D stereoscopic image with the 3D effect, which is called the 3D displaying. The 3D displaying is mainly classified into a light-division type and a time-division type depending on the display principle. For the light-division type 3D displaying, for example, a phase retard 3D displaying, since a display screen displays left-eye and right-eye pictures at the same time, the brightness thereof is half of that of a 2D displaying mode.

A current liquid crystal display device can be switched between a 2D displaying mode and a 3D displaying mode, and however, it can only simply increase a brightness of a backlight source in the 3D displaying mode. Thus, such controlling manner to the backlight source is not flexible and can result in too high brightness in a 2D displaying mode.

SUMMARY

Embodiments of the present invention provide a backlight module and a display device comprising the backlight module configured to flexibly control over the brightness of a backlight source while a displaying mode is switched between a 2D displaying mode and a 3D displaying mode.

An embodiment of the present invention provides a backlight module, comprising: a backlight source, comprising a plurality of backlight lamps; and a backlight source control device, comprising: a backlight source driving device, configured to provide a driving signal to the backlight source; a 2D/3D backlight switching unit; and a first switch, connected with the 2D/3D backlight switching unit, wherein the 2D/3D backlight switching unit is configured to control switching-on and switching-off of the first switch while a displaying mode is switched between a 2D displaying mode and a 3D display- Alternatively, the 2D/3D backlight switching unit receives a 2D/3D switching signal to determine a current displaying mode and then outputs a corresponding control signal to control the first switch to be switched on or switched off; and when the current displaying mode is the 2D displaying mode, the 2D/3D backlight switching unit controls the first switch to be switched off and the backlight lamps directly connected with the backlight source driving device work; and when the current displaying mode is the 3D displaying mode, the 2D/3D backlight switching unit controls the first switch to be switched on and all of the backlight lamps work.

Alternatively, the backlight source driving device comprises a backlight source driving chip and a current control device connected with the backlight source driving chip; the backlight source driving chip is configured to output a driving current to the backlight source and the current control device is configured to control the magnitude of the driving current output by the backlight source driving chip.

Alternatively, the current control device is a current control chip or a control resistor.

Alternatively, the control resistor comprises two resistors with an identical resistance and a second switch, and one of the two resistors is connected in series with the second switch and then connected in parallel with the other of the two resistors.

Alternatively, the 2D/3D backlight switching unit is further connected with the second switch and is configured to control switching-on or switching-off of the second switch while the displaying mode is switched between the 2D displaying mode and the 3D displaying mode.

Alternatively, in order to constant current drive the backlight source, a corresponding pin of the backlight source driving chip is connected with the backlight source.

Alternatively, the first switch and the second switch are controllable metal oxide field effect transistors or triodes, and the backlight lamp is a light emitting diode or a cold cathode fluorescent lamp.

Alternatively, the 2D/3D backlight switching unit is a single chip microcomputer as a digital processing device, a field programmable gate array or a digital signal processing device.

An embodiment of the present invention provides a display device including the above-mentioned backlight module.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

An embodiment of the present invention provides a backlight module configured to be switched between a 2D displaying mode and a 3D displaying mode and a display device comprising the backlight module. Embodiments of the present invention may be applied to a direct type backlight source or a side type backlight source. The number of backlight lamps in the backlight module may be increased to enhance the brightness of a backlight source when displaying a 3D picture. Further, the brightness of the backlight source can be switched between the 2D displaying mode and the 3D displaying mode by using a 2D/3D backlight switching unit and a backlight source driving device, wherein the 2D/3D backlight switching unit can receive a 2D/3D switching signal to determine a current displaying mode and thus, output a control signal to a first switch connected with the backlight source so as to change a switched-on state or a switched-off state of the first switch.

Figure 1:
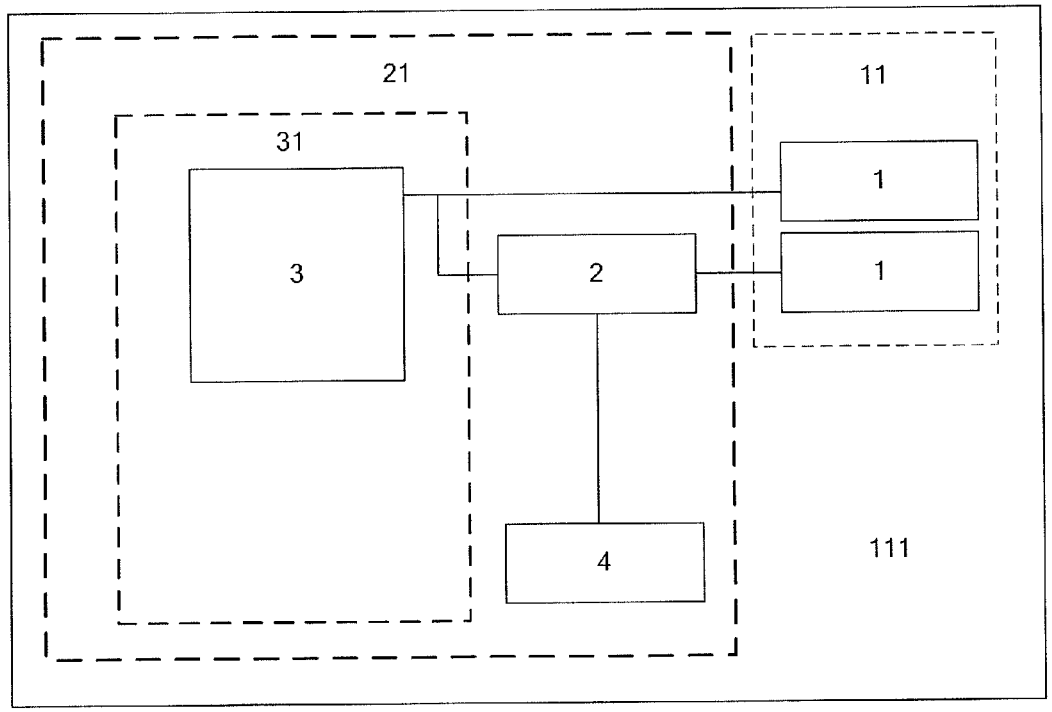
FIG. 1 shows a block view of a backlight module according to an embodiment of the present invention.
Figure 2:
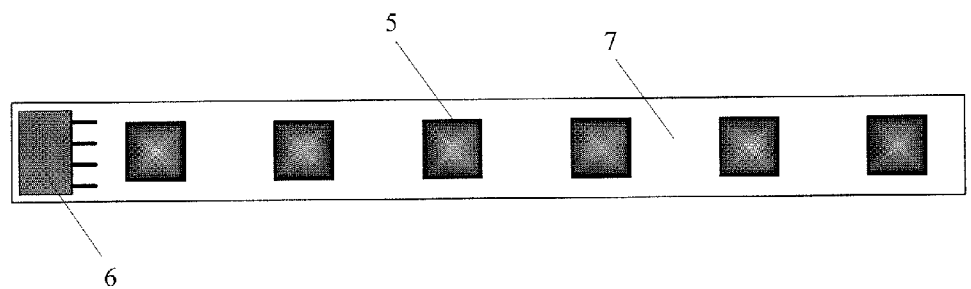
FIG. 2 shows a schematic structural view of a backlight lamp group 1 included in a backlight source of the backlight module according to the embodiment of the present invention shown in FIG. 1.

FIG. 1 shows a block view of a backlight module according to an embodiment of the present invention, and FIG. 2 shows a schematic structural view of a backlight lamp group 1 included in a backlight source of the backlight module according to the embodiment of the present invention shown in FIG. 1. Referring to FIGS. 1 and 2, in FIG. 1, the backlight module 111 comprises: a backlight source 11, including a plurality of backlight lamp groups 1, each of the backlight lamp groups 1 may comprise a backlight lamp 5, a connector 6, a PCB 7 as shown in FIG. 2; a backlight source control device 21, including a backlight source driving device 31, a first switch 2 and a 2D/3D backlight switching unit 4, wherein the backlight source driving device 31 comprises a backlight source driving chip 3.

In the embodiment, the backlight lamp 5 is a light source of the backlight source 11. In each of the backlight lamp groups 1, a positive terminal of one of the backlight lamps 5 is connected to a negative terminal of a previous backlight lamp 5 and a negative terminal thereof is connected to a positive terminal of a next backlight lamp 5 so that a light emitting diode (LED) string is formed in series and a electrical connection between the backlight lamps 5 is implemented by a wire on the PCB 7. The positive and negative terminals of the LED string are respectively connected to corresponding pins of the connector 6 such that the backlight source driving device 31 can drive the LED string. It is noted that the backlight lamp according to the embodiment of the present invention may be a LED, may also be a cold cathode fluorescent lamp (CCFL) and the like. The embodiments of the present invention will be explained by taking the LED lamp as an example.

A space between adjacent two of the backlight lamp groups 1 is determined by an optical simulation to ensure good optical parameters. In practical applications, two backlight lamp groups 1 adjacent up and down may constitute a backlight lamp group unit in which a lower backlight lamp group 1 may be connected with the backlight source driving chip 3 via the first switch 2. The PCB of the backlight lamp group 1 may be white such that it can reflect light incident on the PCB 7 to take full advantage of light from the backlight source.

Figure 4:
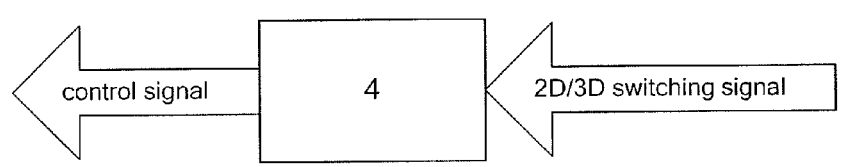
FIG. 4 is a schematic principle view for switching a backlight source according to an embodiment of the present invention.

As shown in FIG. 4, the 2D/3D backlight switching unit 4 can receive a 2D/3D switching signal to determine whether a current displaying mode is a 2D displaying mode or a 3D displaying mode, and in turn, determine whether the first switch 2 connected with the backlight lamp group 1 should be switched on or switched off according to the current displaying mode, thereby output a corresponding control signal to the first switch 2 to control switching-on or switching-off of the first switch. Illustratively, in the 2D displaying mode, the 2D/3D backlight switching unit 4 outputs a low level signal to the first switch 2, and thus, the first switch 2 is switched off, and in this time, the backlight lamp group 1 connected with the first switch 2 can not receive a driving signal sent from the backlight source driving chip 3 and hence the backlight lamp group 1 connected with the first switch 2 does not play a role. In the 3D displaying mode, the 2D/3D backlight switching unit 4 outputs a high level signal to the first switch 2, and thus, the first switch 2 is switched on and the backlight lamp group 1 connected with the first switch 2 can receive a driving signal sent from the backlight source driving chip 3 and normally work.

Alternatively, the backlight source 11 may directly comprise a plurality of backlight lamps 5 wherein a part of the backlight lamps 5 are directly electrically connected to the backlight source driving device 31 and a remaining part of the backlight lamps 5 are electrically connected to the backlight source driving device 31 via the first switch. Illustratively, in the 2D displaying mode, the 2D/3D backlight switching unit 4 outputs a low level signal to the first switch 2, and then, the first switch 2 is switched off and the backlight lamp connected with the first switch 2 can not receive a driving signal sent from the backlight source driving chip 3 and hence not working. In the 3D displaying mode, the 2D/3D backlight switching unit 4 outputs a high level signal to the first switch 2, and then, the first switch 2 is switched on and the backlight lamp connected with the first switch 2 can receive a driving signal sent from the backlight source driving chip 3 and normally work.

Alternatively, the 2D/3D backlight switching unit 4 may also output a high level signal to the first switch 2 to switch off the first switch 2, and output a low level signal to the first switch 2 to switch on the first switch and the embodiments of the present invention do not impose any particular limitation on this. Illustratively, the high and low levels here may be high and low levels for a transistor-transistor logic (TTL) or a complementary metal oxide semiconductor (CMOS).

Alternatively, the 2D/3D backlight switching unit 4 may also output a pulse signal to control switching-on and switching-off of the first switch 2.

Alternatively, the 2D/3D backlight switching unit 4 according to the embodiment of the present invention may be a single chip microcomputer as a digital processing device, a field programmable gate array or a digital signal processing device.

Figure 3:
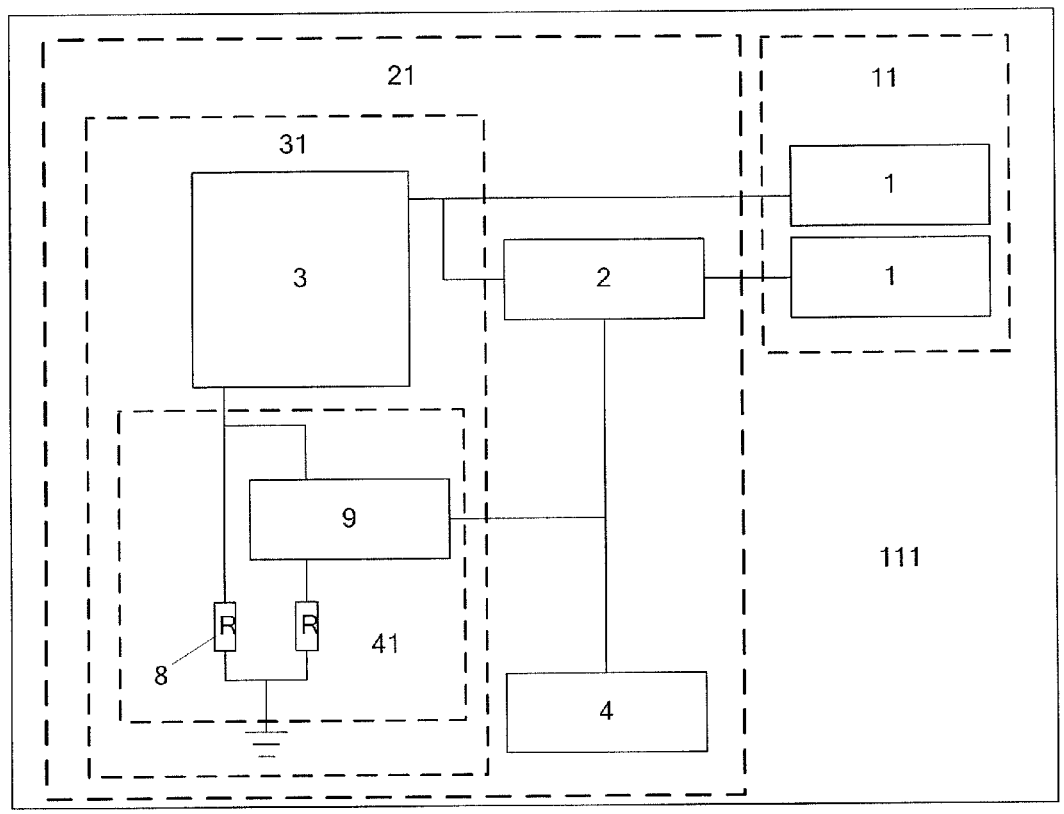
FIG. 3 shows a block view of a backlight module according to another embodiment of the present invention.

FIG. 3 shows a block view of a backlight module according to another embodiment of the present invention. With reference to FIG. 3, unlike the backlight module shown in FIG. 1, the backlight source driving device according to the embodiment may further comprise a current control device 41. Components other than the current control device 41 are the same as these according to the embodiment shown in FIG. 1 and are not described in detail here.

In FIG. 3, the backlight source driving chip 3 and the current control device 41 may constitute a LED driving circuit as the backlight source driving device 31. Herein, the current control device 41 may be a current control chip or a control resistor. Illustratively, the embodiment of the present invention will be explained by taking a control resistor used as the current control device 41 as an example. As shown in FIG. 3, the backlight source driving device 31 comprises a backlight source control chip 3 and a control resistor 8, wherein in order to constant current drive the backlight lamp group 1 (or the backlight lamp 5), a corresponding pin of the backlight source driving chip 3 is connected with the backlight lamp group 1 (or backlight lamp 5). The backlight source driving chip 3 may provide a maximum driving current that may be twice as much as a operating current of a single backlight lamp group 1 (or a single backlight lamp 5). In the 3D displaying mode, two backlight lamp groups 1 (or two backlight lamps 5) operate in a parallel connection form and the driving current may be twice that of a single backlight lamp group 1 (or the backlight lamp 5).

The maximum driving current of the LED driving circuit may be determined by the control resistor 8. For example, a pin of the backlight source driving chip 3 connected with the control resistor 8 may have a constant voltage, and the magnitude of a current flowing thereto determines the magnitude of a current in the backlight lamp group 1. The control resistor 8 may comprises two resistors with identical or different resistances connected in parallel, wherein one resistor may be connected in series with a second switch 9 and then connected in parallel with another resistor. When the second switch 9 is switched off, the driving current is determined by one resistor among the control resistors 8. When the second switch 9 is switched on, the two resistors in the control resistor 8 are connected in parallel, and if the two resistors of the control resistor 8 have the same resistance, the resistance of the entire control resistor 8 is one half of that of a single resistor, thereby doubling the maximum current of the LED driving circuit.

Alternatively, the maximum driving current of the LED driving circuit may be determined by the current control chip.

The 2D/3D backlight switching unit 4 may also control switching-off and switching-on of the second switch 9 by being connecting to the second switch 9 and a method in which the 2D/3D backlight switching unit 4 controls the second switch 9 may be the same as that for the first switch 2. Exemplarily, the 2D/3D backlight switching unit 4 may control the second switch 9 to be switched on while control the first switch 2 to be switched on, and may also control the second switch 9 to be switched off while control the first switch 2 to be switched off. Alternatively, the 2D/3D backlight switching unit 4 may control the second switch 9 to be switched off while control the first switch 2 to be switched on, and may also control the second switch 9 to be switched on while control the first switch 2 to be switched off.

As can be seen from above, the backlight module according to the embodiment of the present invention comprises a backlight source and a backlight source control device; the backlight source control device comprises a backlight source driving device configured to provide a driving signal for the backlight source and a first switch; wherein the backlight source driving device is directly connected with a part of backlight lamps in the backlight source and the remaining backlight lamps in the backlight source are connected with the backlight source driving device via the first switch; the backlight source control device further comprises a 2D/3D backlight switching unit connected with the first switch and configured to control the first switch to be switched on or switched off while the displaying mode is switched between the 2D displaying mode and the 3D mode.

The 2D/3D backlight switching unit can receive a 2D/3D switching signal to determine a current displaying mode and output a corresponding control signal to the first switch so as to control switching-off and switching-on of the first switch. In the 2D displaying mode, the first switch is controlled to be in a switched-off state and the backlight lamp (or the backlight lamp group) directly connected with the backlight source driving device works. In the 3D displaying mode, the first switch is controlled to be in the switched-on state, and all of the backlight lamps (or the backlight lamp groups) work.

The backlight source driving device may comprise a backlight source driving chip and a current control device connected with the backlight source driving chip; the backlight source driving chip is configured to output a driving current to the backlight source and the current control device is configured to control the magnitude of the driving current output from the backlight source driving chip.

The current control device may be a current control chip or a control resistor.

The control resistor may comprises two resistors with an identical resistance and a second switch, wherein one resistor is connected in series with the second switch and then connected in parallel with another resistor.

The 2D/3D backlight switching unit may also be connected with the second switch and configured to control the second switch to be switched on or switched off while the displaying mode is switched between the 2D displaying mode and the 3D displaying mode.

In order to constant current drive the backlight source, a corresponding pin of the backlight source driving chip 3 may be connected with the backlight source.

The first switch and the second switch may be controllable metal oxide field effect transistors or triodes; and the backlight lamp may be a light emitting diode.

The 2D/3D backlight switching unit may be a single chip microcomputer as a digital processing device, a field programmable gate array or a digital signal processing device.

An embodiment of the present invention further provides a display device including the backlight module according to any embodiment of the present invention.

One example of the display device is a liquid crystal display device, wherein a TFT array substrate and an opposite substrate are disposed to face each other to form a liquid crystal cell, and a liquid crystal material is filled in the liquid crystal cell. The opposite substrate is a color filter substrate, for example. A pixel electrode of each pixel unit of the TFT array substrate is used to apply an electric field, so as to control a rotation of the liquid crystal material and to perform a displaying operation. In some examples, the liquid crystal display device further comprises the backlight module according to any embodiment of the present invention and provided for the array substrate.

Another example of the display device is an organic electroluminescence display device wherein a pixel electrode of each pixel unit of a TFT array substrate serves as an anode or a cathode for driving organic luminescence material to emit light for display operation.

The display device may be a mobile telephone, a palmtop computer or an electronic paper.

As can be seen from above, by flexibly controlling over a backlight source, the brightness of the backlight source can be flexibly controlled while a display device is switched between the 2D displaying mode and the 3D displaying mode.

The embodiment of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

The invention claimed is:

1. A backlight module, comprising:
   a backlight source, comprising a plurality of backlight lamps; and
   a backlight source control device, comprising:
   a backlight source driving device, configured to provide a driving signal to the backlight source;
   a 2D/3D backlight switching unit; and
   a first switch, connected with the 2D/3D backlight switching unit,
   wherein the 2D/3D backlight switching unit is configured to control switching-on and switching-off of the first switch while a displaying mode is switched between a 2D displaying mode and a 3D displaying mode, and the backlight source driving device is directly connected with a part of the plurality of backlight lamps of the backlight source, and the remaining backlight lamps in the backlight source are connected with the backlight source driving device via the first switch.

2. The backlight module according to claim 1, wherein the 2D/3D backlight switching unit receives a 2D/3D switching signal to determine a current displaying mode and then outputs a corresponding control signal to control the first switch to be switched on or switched off; and when the current displaying mode is the 2D displaying mode, the 2D/3D backlight switching unit controls the first switch to be switched off and the backlight lamps directly connected with the backlight source driving device work; and when the current displaying mode is the 3D displaying mode, the 2D/3D backlight switching unit controls the first switch to be switched on and all of the backlight lamps work.

3. The backlight module according to claim 1, wherein the backlight source driving device comprises a backlight source driving chip and a current control device connected with the backlight source driving chip; the backlight source driving chip is configured to output a driving current to the backlight source and the current control device is configured to control the magnitude of the driving current output by the backlight source driving chip.

4. The backlight module according to claim 3, wherein the current control device is a current control chip or a control resistor.

5. The backlight module according to claim 4, wherein the control resistor comprises two resistors with an identical resistance and a second switch, and one of the two resistors is connected in series with the second switch and then connected in parallel with the other of the two resistors.

6. The backlight module according to claim 5, wherein the 2D/3D backlight switching unit is further connected with the second switch and is configured to control switching-on or switching-off of the second switch while the displaying mode is switched between the 2D displaying mode and the 3D displaying mode.

7. The backlight module according to claim 3, wherein in order to constant current drive the backlight source, a corresponding pin of the backlight source driving chip is connected with the backlight source.

8. The backlight module according to claim 5, wherein the second switch is a controllable metal oxide field effect transistor or a triode.

9. The backlight module according to claim 1, wherein the first switch is a controllable metal oxide field effect transistor or a triode.

10. The backlight module according to claim 1, wherein the plurality of backlight lamps of the backlight source are grouped into a plurality of backlight lamp groups, and for each of the backlight lamp groups, the backlight lamps are connected in series, and each of the backlight lamp groups is electrically connected with the backlight source driving device or the first switch via a connector.

11. The backlight module according to claim 10, wherein adjacent two backlight lamp groups constitute a backlight lamp group unit, one of the adjacent two backlight lamp groups is directly connected with the backlight source driving device and another backlight lamp group is connected with the backlight source driving device via the first switch.

12. The backlight module according to claim 10, wherein each of the backlight lamp groups is formed on a PCB, and connections between the backlight lamps in each of the backlight lamp groups are implemented by wires on the PCB.

13. The backlight module according to claim 1, wherein the backlight lamp is a light emitting diode or a cold cathode fluorescent lamp.

14. The backlight module according to claim 1, wherein the 2D/3D backlight switching unit is a single chip microcomputer as a digital processing device, a field programmable gate array or a digital signal processing device.

15. A display device, comprising: the backlight module according to claim 1.

16. The display device according to claim 15, wherein the 2D/3D backlight switching unit receives a 2D/3D switching signal to determine a current displaying mode and then outputs a corresponding control signal to control the first switch to be switched on or switched off; and when the current displaying mode is the 2D displaying mode, the 2D/3D backlight switching unit controls the first switch to be switched off and the backlight lamps directly connected with the backlight source driving device work; and when the current displaying mode is the 3D displaying mode, the 2D/3D backlight switching unit controls the first switch to be switched on and all of the backlight lamps work.

17. The display device according to claim 15, wherein the backlight source driving device comprises a backlight source driving chip and a current control device connected with the backlight source driving chip; the backlight source driving chip is configured to output a driving current to the backlight source and the current control device is configured to control the magnitude of the driving current output by the backlight source driving chip.

18. The display device according to claim 17, wherein the current control device is a current control chip or a control resistor.

19. The display device according to claim 18, wherein the control resistor comprises two resistors with an identical resistance and a second switch, and one of the two resistors is connected in series with the second switch and then connected in parallel with the other of the two resistors.

20. The display device according to claim 19, wherein the 2D/3D backlight switching unit is further connected with the second switch and is configured to control switching-on or switching-off of the second switch while the displaying mode is switched between the 2D displaying mode and the 3D displaying mode.

* * * * *